United States Patent [19]
Redinger et al.

[11] Patent Number: 4,460,754
[45] Date of Patent: Jul. 17, 1984

[54] PROCESS FOR THE MASS POLYMERIZATION OF VINYL CHLORIDE

[75] Inventors: Robert Redinger, Altötting; Walter Berngruber, Burgkirchen, both of Fed. Rep. of Germany

[73] Assignee: Hoechst Aktiengesellschaft, Fed. Rep. of Germany

[21] Appl. No.: 383,537

[22] Filed: Jun. 1, 1982

[30] Foreign Application Priority Data

Jun. 6, 1981 [DE] Fed. Rep. of Germany ....... 3122614

[51] Int. Cl.³ ............................. C08F 2/02; C08F 2/44
[52] U.S. Cl. ..................................... 526/75; 524/714; 526/78; 526/190; 526/215
[58] Field of Search ......................... 526/75, 78, 82, 83

[56] References Cited
U.S. PATENT DOCUMENTS 3,627,717 12/1971 Kuhnen ................................ 524/424
3,862,066 1/1975 Reiter .................................. 524/180
3,933,776 1/1976 Fournel ................................. 526/75

Primary Examiner—C. A. Henderson
Attorney, Agent, or Firm—Connolly and Hutz

[57] ABSTRACT

A process is described for the two-stage mass polymerization of vinyl chloride, in which 0.1 to 3% by weight, relative to the monomer employed, of one or more of the following compounds which are known as heat stabilizers for polyvinyl chloride: monoalkyltin-IV or dialkyltin-IV compounds in which the residual valencies of the tin are attached to organic radicals via sulfur atoms, and/or aminocrotonic acid esters, are added to the polymerization mixture when a conversion of 65 to 85% has been reached. After thorough removal of the unreacted vinyl chloride from the resulting polymer, preferably at temperatures above the glass transition point of the polymer, products are obtained which have an improved color in comparison with polyvinyl chloride produced by conventional mass polymerization.

5 Claims, No Drawings

PROCESS FOR THE MASS POLYMERIZATION OF VINYL CHLORIDE

BACKGROUND AND FIELD OF THE INVENTION

The present invention relates to a process for the mass polymerization or copolymerization of vinyl chloride.

Since harmful physiological effects of vinyl chloride monomer have recently been detected, it is desirable to obtain, from these monomers, polymers which have as low a content of vinyl chloride monomer as possible. In order to avoid emissions of vinyl chloride monomer into the atmosphere it is also desirable, after polymerization is complete, to remove the unreacted monomer(s) as substantially as possible in the earliest possible stage of the working up process.

A process is known for decreasing the content of vinyl chloride monomer in polyvinyl chloride produced by mass polymerization, in which process, after the completion of polymerization, the polymerization kettle is placed under a reduced pressure of not more than 0.4 atmospheres, using steam, and, while maintaining this reduced pressure, 2 to 5% by weight, relative to the polyvinyl chloride present in the kettle, of saturated or unsaturated steam of a temperature of at least 80° C. are introduced, while stirring, the temperature in the polymerization kettle being kept above the dew point of water, but below the glass transition temperature of the polymer. It is stated to be possible to obtain, by this means, polymers containing down to 0.0005% by weight or less of vinyl chloride, the polymers being stated to be completely free from discoloration.

However, this process cannot be carried out with equally good success on all vinyl chloride polymers obtainable by mass polymerization; if the polymer particles are difficult to degas, the content of residual vinyl chloride in the polymer remains at a higher level, as a result of which either uneconomically long treatment times or the use of higher treatment temperatures, above the glass transition temperature of the polymer, are necessary, which in turn leads to discoloration of the polymer.

A process for the removal of vinyl chloride present in a vinyl chloride polymer is also known in which the dry polymer is heated to a temperature between the glass transition range and 180° C. by direct condensation of steam thereon, the polymer is kept at this temperature for a time sufficient to remove the greater part of the monomer present in the polymer, and the polymer is cooled to below its glass transition range by evaporating the water vapor which has condensed on the polymer. This process is stated to be particularly suitable for polymers which have been obtained by mass polymerization, but evidently only produces products which still contain vinyl chloride monomer in quantities of 0.05 to 0.3% by weight. If the vinyl chloride polymer obtained by this process is treated at a temperature at which there is a risk of irreversible degradation, a heat stabilizer should be added. This can be added in the course of the polymerization or immediately before the treatment according to the process described. The heat stabilizers which are customary for vinyl chloride polymer, or the mixtures of such heat stabilizers, should be suitable, in particular they should be metal salts of organic or inorganic acids, such as, for example, the salts of lead, barium, calcium or cadmium, organometallic compounds, such as organotin compounds, epoxides, such as epoxidized oils, and the like. As the comparison tests which follow will show, the subject of the present invention could not be deduced from these general statements.

A process is also known for the preparation of vinyl halide homopolymers, vinyl halide copolymers or vinyl halide graft polymers, containing up to approximately 50% by weight of a comonomer and/or of a compatible backbone polymer, in which process polymerization is carried out in the liquid phase and at least part of the polymerization is carried out in the presence of an organotin mercaptide ester, in a quantity sufficient to lower the molecular weight, of the formula $R_n$—Sn—(-S—R'—COOR")$_{4-n}$ wherein n denotes an integer from 1 to 3, R and R" denote monovalent organic groups selected from the group comprising alkyl, aryl, alkylaryl and aralkyl groups, and R' denotes a divalent organic group belonging to the group comprising alkylene and aralkylene groups, and the polymerization is also carried out in the presence of an initiating quantity of an organic azo initiator. The process is used for regulating the molecular weight of the polymer produced without the need to increase the polymerization temperature in order to prepare a polymer of low molecular weight. The desired effect only takes place in the presence of an organic azo initiator. If this azo initiator is replaced by a corresponding amount of a known organic peroxide initiator having essentially the same initiator activity as the azo initiator, it is stated that little or no polymer is obtained, ie. the yield of polymer is less than about 5%. The process is stated to be preferably suitable for the mass polymerization of vinyl chloride, in which connection, if a two-stage polymerization is carried out, the organotin agent for lowering the molecular weight and the organic azo initiator should preferably be added at the start of the second reaction stage. As the comparison test which follows will demonstrate, this leads to no improvement in the color of the polymer produced after thorough removal of the residual monomer. The statements relating to the unfavorable effect of organic peroxide initiators could not in any case encourage those skilled in the art to employ these initiators in conjunction with organotin compounds in the mass polymerization of vinyl chloride.

SUMMARY OF THE INVENTION

It has now been found, surprisingly, that the addition to the polymerization batch of only a relatively narrow selection of the known heat stabilizers for polyvinyl chloride, within a quite specific range during the progress of the two-stage mass polymerization of vinyl chloride leads to an improvement, in the color of the polymer produced after the thorough removal of the residual monomers, which could not have been expected and which is not achieved if other known heat stabilizers are used, and which is also not achieved even if the known heat stabilizers which are suitable for the process according to the invention are used, but are not introduced within the range according to the invention during the progress of the two-stage mass polymerization of vinyl chloride.

The new process for the mass polymerization or copolymerization of vinyl chloride at 30° to 80° C., under pressure and with agitation of the polymerization mixture, in the presence of at least one known peroxide polymerization initiator which decomposes to form free radicals and of at least one known heat stabilizer for polyvinyl chloride, and also, if appropriate, in the presence of up to 30% by weight, relative to the final polymerization mixture, of monomers and/or polymers which are copolymerizable with vinyl chloride, and also in the presence of known polymerization auxiliary substances, in two stages, the transition from the first to the second polymerization stage taking place when 6 to 20% by weight of the monomer(s) employed in the first stage have been converted into polymer, and the polymerization in the second stage being completed when 65 to 90% by weight of the total monomer(s) employed have been converted into polymer, the unreacted monomers then being removed from the polymer formed down to residual contents of less than 0.001% by weight, relative to the polymer, comprises adding to the polymerization mixture, in the second polymerization stage, when 60 to 85% by weight of the total monomer(s) employed have been converted into polymer, but when, after the completion of the polymerization, no monomer has yet been removed from the polymerization mixture, 0.01 to 3% by weight, relative to total monomers employed, of at least one aminocrotonic acid ester which is known as a heat stabilizer for polyvinyl chloride or of a monoalkyltin-IV or dialkyltin-IV compound in which the residual valencies of the tin are attached to organic radicals via sulfur atoms, or mixtures of the said compounds.

DESCRIPTION OF PREFERRED EMBODIMENTS

Suitable processes for the mass polymerization or copolymerization of vinyl chloride in two stages are described, for example, in Ullmanns Enzyklopädie der technischen Chemie (Ullmann's Encyclopedia of Industrial Chemistry), 4th edition, volume 19 (1980), page 344 and by Helmut Kainer "Polyvinylchlorid und Vinylchlorid-Mischpolymerisate" ("Polyvinyl chloride and vinyl chloride copolymers"), Springer Verlag (1965), pages 7 et seq.; and also in German Auslegeschriften Nos. 1,520,594 and 1,520,595 and German Offenlegungsschrift No. 1,595,067. The reaction is carried out under the autogenous pressure of the polymer(s) employed at temperatures of 30° to 80° C. In general, below 30° C. the times become too long to obtain profitable yields of polymers; in addition the molecular weight (the K-value) of the polymer produced is as a rule too high for most industrial fields of application. Above 80° C., the polymerization reaction becomes more difficult to control, the reaction has to be carried out under unnecessarily high pressures requiring additional outlay on apparatus, and the molecular weight (the K-value) of the polymer produced becomes too low for its main application, fabrication in the thermoplastic range into many kinds of semi-finished products and finished articles. The reaction is preferably carried out within the temperature range from 40° to 70° C.

It is advantageous to carry out the two stages of the polymerization in two separate reaction vessels, the polymerization mixture being agitated rapidly in the first stage, as described in the publications quoted above, for example using a turbine stirrer, and being agitated slowly in the second stage, for example by means of a gate paddle agitator or by means of a stirrer in the form of one or more strips wound in a helical shape, or by using a rolling autoclave in which the axis is preferably horizontal and which contains balls, rods or similar agents as a means of stirring.

The polymerization is carried out in the presence of 0.001 to 1% by weight, preferably 0.01 to 0.3% by weight, relative to the monomer(s) employed, of peroxide catalysts which decompose to form free radicals, such as, for example, diaryl or diacyl peroxides, such as diacetyl peroxide, acetylbenzoyl peroxide, dilauroyl peroxide, dibenzoyl peroxide, bis-2,4-dichlorobenzoyl peroxide, bis-2-methylbenzoyl peroxide or bis-2-methoxybenzoyl peroxide; dialkyl peroxides, such as di-tert.-butyl peroxides; per-esters, such as tert.-butyl percarbonate, tert.-butyl peracetate, tert.-butyl peroctoate, tert.-butyl perpivalate, tert.-butyl perneodecanoate, tert.-amyl perneodecanoate or cumyl perneodecanoate; dialkyl peroxydicarbonates, diisopropyl peroxydicarbonate, di-2-ethylhexyl peroxydicarbonate, dicyclohexyl peroxydicarbonate, diethylcyclohexyl peroxydicarbonate, dibenzyl peroxydicarbonate, dicetyl peroxydicarbonate or dimyristyl peroxydicarbonate; or mixed anhydrides of organic sulfoper-acids and organic acids, such as acetylcyclohexyl sulfonyl peroxide. Other suitable peroxide polymerization initiators which decompose to form free radicals are described by J. Brandrup and E. H. Immergut, editors of "Polymer Handbook," Interscience Publishers, 2nd edition 1975, chapter II, pages 12 to 39.

Azo compounds which are known for the polymerization of vinyl chloride, such as 2,2'-azobis-isobutyronitrile or 2,2'-azobis-(2,4-dimethyl)-valeronitrile, are less suitable for the purposes of the present invention, since, in conjunction with the heat stabilizers to be employed in accordance with the invention, they lead either to no improvement at all, or only to an inadequate improvement, in color when the unreacted monomer is thoroughly removed from the polymers produced.

Before or during the polymerization it is possible to add to the polymerization batch, for example, the following known polymerization auxiliaries: molecular weight regulators, such as, for example, chlorinated or brominated hydrocarbons such as dichloroethylene, trichloroethylene, tetrachloroethylene, chloroform, bromoform or methylene chloride, and mercaptans and also further polymerization auxiliaries, such as antioxidants, for example 2,6-di-tert.-butyl-4-methylphenol or tris-nonylphenyl phosphite, other additives, such as epoxidized oils, for example soya bean oil; fatty alcohols or fatty acid esters or auxiliaries for processing the polymer further, such as, for example, known lubricants, waxes, plasticizers or pigments. The last-mentioned auxiliaries for further processing can also be added after the completion of polymerization, if appropriate in a dissolved, molten or dispersed state.

The process according to the invention is also suitable for the mass copolymerization of vinyl chloride in the presence of 0.1 to 30% by weight, relative to the final polymerization mixture, of monomers and/or polymers which are copolymerizable with vinyl chloride. The polymerization is preferably carried out in the presence of 0.3 to 10% by weight, relative to the final polymerization mixture, of the said monomers and/or polymers. Particularly good results are obtained if none, or only small quantities, about 0.3 to 2% by weight, relative to the final polymerization mixture, of the said monomers and/or polymers are present.

One or more of the following monomers, for example, are suitable for copolymerization with vinyl chloride: olefins, such as ethylene or propylene; vinyl esters of straight-chain or branched carboxylic acids having 2 to 20, preferably 2 to 4, C atoms, such as vinyl acetate, propionate, butyrate or 2-ethylhexoate, vinyl isotridecanoate; vinyl halides, such as vinyl fluoride, vinylidene fluoride or vinylidene chloride; vinyl esters; vinylpyridine; monoesters or diesters of unsaturated acids, such as maleic, fumaric, acrylic or methacrylic acid with monoalcohols or dialcohols having 1 to 10 C atoms; maleic anhydride; maleimide and N-substitution products thereof containing aromatic, cycloaliphatic and optionally crosslinked aliphatic substituents; acrylonitrile; and styrene.

For graft copolymerization it is possible to use, for example, crosslinked or non-crosslinked elastomeric polymers which have been obtained by polymerization of one or more of the following monomers: dienes, such as butadiene or cyclobutadiene; olefins, such as ethylene or propylene; styrene; unsaturated acids, such as acrylic or methacrylic acid and esters thereof with monoalcohols or dialcohols having 1 to 10 C atoms; acrylonitrile; vinyl compounds, such as vinyl esters of straight-chain or branched carboxylic acids having 2 to 20, preferably 2 to 4, C atoms; vinyl halides, such as vinylidene chloride and vinyl chloride, the latter, however, only with at least one of the monomers mentioned previously. Polymers to be grafted are advantageously employed dissolved in the monomer(s) or in the form of a dispersion in the monomer(s).

The transition of the polymerization batch from the first to the second polymerization stage is effected when 6 to 20% by weight of the monomer(s) employed in the first polymerization stage have been converted into polymers. Below a conversion of 6% by weight, the particle size distribution of the final polymer produced in the second polymerization stage is very wide, the bulk density is low and the pourability is poor. An unfavorably high proportion of coarse particles is also observed. The same disadvantageous properties are observed if the conversion in the first polymerization stage is more than 20% by weight relative to the monomer(s) employed in this stage. It is preferable to polymerize to a conversion of 7 to 15% by weight in the first stage.

The polymerization mixture is now transferred into the second stage, further monomer or monomers and initiator and, if appropriate, further polymerization auxiliaries and/or polymers which are suitable for graft copolymerization with vinyl chloride are advantageously added and polymerization is carried further up to a conversion of 65 to 90% by weight, relative to the total monomer(s) employed. The polymerization is then completed by cooling and, if appropriate, also by adding substances which inhibit the activity of initiators.

If polymerization in the second stage is only taken to a conversion of less than 65% by weight, the polymer produced as a rule has an excessively low bulk density; in addition the space-time yield becomes lower and the process thus becomes less profitable. At a polymerization up to more than 90% by weight conversion, the polymer produced has a high proportion of compact particles (so-called "glass particles") and, additionally, a bulk density which is undesirably high for many end uses. Residual monomers are often difficult to remove from such a polymer, which makes undesirably long after-treatment times necessary. It is preferable to polymerize until a conversion of 70 to 87% by weight is reached. The conversion of the monomer(s) into the polymer can be determined by known processes, for example by measuring the quantity of heat formed in the polymerization.

Before the start of every polymerization, interfering gases (for example air) present in the reaction space are removed by displacement with gaseous vinyl chloride. This is effected by vaporizing comparatively small quantities of the vinyl chloride monomer employed in each case. Undesirable gases (for example hydrogen chloride) can also be formed during the polymerization reaction and are advantageously removed in the same manner. As a rule, it is sufficient for this to remove in the form of gas less than 10% by weight of the total vinyl chloride monomer employed.

One compound or mixtures of several compounds from the initiators described earlier in the text can be employed, and the initiator used in the first stage and that used in the second stage, or the initiator mixture used in these stages, can be different in terms of type and quantity. The same also applies to the monomers or polymers which are copolymerizable with vinyl chloride and which can optionally be employed, and also to the further polymerization auxiliaries which can optionally be used in addition to the initiators.

In accordance with the invention, 0.01 to 3% by weight, relative to total monomers employed, of at least one aminocrotonic acid ester which is known as a heat stabilizer for polyvinyl chloride or of a monoalkyl tin-IV or dialkyl tin-IV compound in which the residual valencies of the tin are attached to organic radicals via sulfur atoms, or mixtures of the said compounds, are added to the polymerization batch in the second stage, when 60 to 85% by weight of the total monomer(s) employed have been converted into polymers, but when, after the completion of the polymerization, no monomer has yet been removed from the polymerization mixture.

Examples of aminocrotonic acid esters which are known as heat stabilizers for polyvinyl chloride are esters of β-aminocrotonic acid with monohydric, straight-chain, saturated alcohols containing 12 to about 22, preferably 12 to about 18, C atoms, and also β-aminocrotonic acid esters of diols in which the chain of C atoms can be interrupted by thioether bridges. Examples of suitable compounds are the β-aminocrotonic acid esters of lauryl or stearyl alcohol, of 1,3-butanediol, 1,4-butanediol, 1,2-dipropylene glycol or of thiodiethylene glycol (2,2'-hydroxydiethyl thioether). It is also possible to employ mixtures of such aminocrotonic acid esters.

Tin compounds known as heat stabilizers for polyvinyl chloride which are suitable for the process according to the invention are compounds of the formula

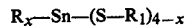

in which x denotes the number 1 or 2, R denotes an alkyl group having 1 to 10 C atoms, in which one H atom can be replaced by another substituent, for example by a carboxylic acid ester group, which contains, as the alcoholic component, an aliphatic alcohol; and $R_1$ denotes an organic radical, for example the radical $—CH_2COOR_2$ wherein $R_2$ represents a straight-chain or branched alkyl group having 6 to 18 carbon atoms.

The following are examples of suitable compounds which correspond to the abovementioned formula: monomethyltin tris-(isooctyl thioglycolate), dimethyltin bis-(isooctyl thioglycolate), 2-carbobutoxyethyltin tris-(isooctyl thioglycolate), bis-(2-carbobutoxyethyltin) bis-(isooctyl thioglycolate), mono-n-octyltin tris-(isooctyl thioglycolate), di-n-octyltin bis-(isooctyl thioglycolate), mono-n-octyltin tris-(decyl thioglycolate), mono-n-octyltin tris-(dodecyl thioglycolate), di-n-octyltin bis-(dodecyl thioglycolate), di-n-octyltin bis-(hexadecyl thioglycolate), di-n-butyltin bis-2-ethylhexyl thioglycolate) and mono-n-butyltin tris-(2-ethylhexyl thioglycolate). It can also be advantageous to employ mixtures of the said tin stabilizers which are known as heat stabilizers for polyvinyl chloride; similarly, it is also possible to use, with good results, mixtures of the aminocrotonic acid esters which are known as heat stabilizers for polyvinyl chloride and have been mentioned earlier in the text, and of the tin compounds just mentioned. Surprisingly, only a very slight activity or none at all is exhibited by, for example, dialkyltin-IV compounds in which the residual valencies of the tin are attached to organic radicals via oxygen atoms.

As already stated earlier in the text, 0.01 to 3% by weight, relative to the total monomer employed, of the aminocrotonic acid esters or of the tin compounds or of mixtures thereof are added to the polymerization batch. If less than 0.01% by weight is added, no action, or only a slight action, is observed, while if more than 3% by weight is added, it is not possible to detect any further action which would justify the high cost of adding such quantities, on the contrary, negative effects on the course of the polymerization are observed, such as the formation of incrustations and an increased proportion of coarse material. It is preferable to add to the polymerization mixture 0.05 to 1% by weight, in particular 0.05 to 0.3% by weight, relative to monomers initially employed, of at least one, but, if appropriate, also of mixtures, of the heat stabilizers mentioned earlier in the text.

Particularly good results are achieved if at least one di-n-octyltin-IV bis-(alkylthioglycolate) in which the ester alkyl groups each contain 8 to 16 C atoms, is used as the heat stabilizer. It can also be preferable to employ at least one β-aminocrotonic acid ester containing, as the alcoholic component, an aliphatic dialcohol in which the carbon chain can be interrupted by a thioether bridge and contains 4 to 6 C atoms.

The said heat stabilizers or mixtures thereof are added, as already described above, to the polymerization mixture when 60 to 85% by weight of the total monomer(s) employed have been converted into polymers. If the addition is made at a conversion below 60% by weight, surprisingly, no action according to the invention, or only a very slight action, is observed. The addition can be effected immediately before the completion of the polymerization reaction, but the total quantity of the unreacted monomer(s) should, as far as possible, still be present in the polymerization mixture. If the addition is effected after the bulk of the unreacted monomer(s) has already been removed, the action according to the invention does not take place or takes place only to a minor extent. It is preferable to add the heat stabilizers described in greater detail earlier in the text in the second stage of the polymerization, when 70 to 80% by weight of the total monomer(s) employed have been converted into polymers, polymerization being continued for about a further 10 to 45 minutes after the addition.

After the completion of the polymerization, the polymerization batch is cooled and freed, to such an extent, from the unreacted monomer(s), in accordance with customary processes, by releasing the pressure or evacuating the polymerization vessel once or several times, with or without passing steam or inert gases through the latter, at temperatures below or preferably above the glass transition point of polyvinyl chloride up to polymer temperatures of about 120° C., if necessary using additional apparatus which makes possible a thorough mixing of pulverulent polymer and gas, that the content of monomeric vinyl chloride in the polymerization batch is less than 0.001% by weight, preferably less than 0.0002% by weight, relative to the polymer. The vinyl chloride which is evolved in the form of gas is recovered and reused by known processes for example by condensation or adsorption/desorption.

It is possible, in accordance with the process according to the invention, to prepare, with comparatively short after-treatment times, polymers which contain less than 0.0002% by weight of residual vinyl chloride monomer and which exhibit no deterioration in colour or other desirable properties. The polymers thus produced can be used for any field of application in which mass polymers have hitherto been used, depending on their pattern of properties. The process can be carried out simply and without problems.

The following examples are intended to illustrate the invention in greater detail.

The results measured were determined by the following methods:
1. K value by DIN 53,726, solvent: cyclohexanone;
2. Residual vinyl chloride content: by gas chromatorgraphy using the "head-space" method (Zeitschrift für analytische Chemie, 255 (1971), pages 345 to 350);
3. Discoloration test:

|  | Parts by weight |
|---|---|
| Polymer | 100 |
| Di-n-octyltin bis-(ethylhexyl thioglycolate) having a small content of mono-n-octyltin tris-(ethylhexyl thioglycolate) | 1.1 |
| Glycerol monooleate | 0.4 |
| Lubricant mixture consisting of hardened caster oil, triglyceride and monoglyceride, obtainable under the trade name Loxiol GH 4 | 0.7 |
| Montanic acid ester of 1,3-butanediol | 0.1 |

The constituents of the formulation are mixed in a heated mixer until the temperature of the material to be mixed has risen to 110° C. (approx. 15 minutes) and are then discharged into a cooled mixer and cooled to 30° C. (approx. 15 minutes). This mixture is extruded in a single-screw extruder (screw diameter 50 mm, length 20 D) through a die of diameter 32 mm having an internal mandrel of diameter 28 mm, to give a tube, which is cooled in a water bath and cut into sections 150 mm in length. The processing temperatures in the extruder are as follows: feed zone 140° C., output zone 160° C., head including tubular die 180° C.

The tube sections are assessed visually, by inspecting the cut edges, under a daylight lamp and against a neutral, white background, in comparison with a tube prepared in the same manner using a standard polymer, in terms of the following scale of ratings:
Rating 1: color as standard (as a rule slightly yellowish)
Rating 2: slightly discolored (yellowish)
Rating 3: distinctly discolored (yellow)
Rating 4: considerably discolored (dark yellow)
Rating 5: fairly severely discolored (brown-yellow)
Rating 6: severely discolored (orange-brown)
Rating 7. very severely discolored (strongly red-brown)

Rating 8: even more severely discolored than 7 (strong violet-brown to black-brown).

The standard used is a vinyl chloride homopolymer of K value 60, prepared by the mass polymerization process according to the state of the art, such as is obtained after polymerization without the addition of heat stabilizers and without special after-degassing processes.

EXAMPLES 1 TO 5 AND COMPARISON TESTS A TO H

In order to demonstrate the effectiveness of the process according to the invention, compared with other procedures which are in some cases known from the state of the art, the procedure was in all cases carried out in accordance with a fundamental procedure corresponding to a two-stage mass polymerization process, as follows:

125 g of a 65% strength by weight solution of di-2-ethylhexyl peroxydicarbonate in isododecane were charged to an autoclave of 500 l capacity, made of special stainless steel and equipped with a double jacket for temperature control and a turbine stirrer, and the autoclave was evacuated to a pressure of 5 kPa. 362 kg of vinyl chloride were then charged and 19 kg thereof were removed as gas together with residual quantities of air, leaving 343 kg of vinyl chloride. The turbine stirrer was then switched on and the mixture was stirred at 400 rpm., in the course of which it was heated to 70° C., corresponding to a pressure of 1.27 MPa. The reaction mixture was stirred for about 30 minutes at this temperature, until measurement of the heat formed in the reaction indicated a conversion of 10% by weight, relative to monomer employed. The reaction mixture was then discharged into a horizontal autoclave made of special stainless steel, which had a capacity of 1 m$^3$ and was equipped with a paddle stirrer operating close to the wall. Before the reaction mixture was added, 210 kg of vinyl chloride, 125 g of a 65% strength by weight solution of di-2-ethylhexyl peroxydicarbonate in isododecane and 200 g of dilauroyl peroxide were added to the 1 m$^3$ autoclave. The paddle stirrer was operated at a rate of 200 rpm, the internal temperature in the second autoclave was adjusted to 64° C., and the main polymerization was carried out for about 5 hours under a pressure of 1.07 MPa. During this time a total of 21 kg of vinyl chloride was removed as gas from the autoclave, in order to remove oxygen originating from the air contained in the autoclave, and also other interfering gases. The heat formed during the polymerization was determined and from this it was possible to calculate the conversion in percent by weight, relative to the total quantity of monomer employed for the polymerization (=532 kg). This left out of consideration the total of 40 kg of vinyl chloride monomer which had been removed from the polymerization batch in the form of gas at the start of, and during, the two polymerization stages in order to displace other interfering gases, since this quantity could not take part in the polymerization. The heat formed in the reaction was also used to determine the conversion at which, if appropriate, further substances as described in greater detail later in the text, were added to the polymerization batch.

As already stated above, the main polymerization was terminated after about 5 hours by releasing the pressure in the autoclave from about 1.07 MPa to about 0.39 MPa and then by reducing the pressure in the autoclave further from 0.39 MPa to 16 kPa by means of a compressor. In the course of this, most of the unreacted residual vinyl chloride monomer evaporated, as a result of which the polymerization batch cooled down quickly. The autoclave was then further evacuated from a pressure of 16 kPa to 5 kPa. The contents of the autoclave, composed essentially only of pulverulent polyvinyl chloride, were then heated to an internal temperature of 95° C. and steam was passed into the autoclave at a rate of 0.06 kg per hour and per kg of polymer, for 100 minutes, under a pressure of 46.6 kPa, while stirring the contents of the autoclave. The steam was then removed from the autoclave together with gaseous monomer. At the end of the steam treatment time, the admission of steam was discontinued and the autoclave was evacuated to 16 kPa. After equalizing the pressure with nitrogen, the autoclave was cooled and opened. The polyvinyl chloride powder thus obtained had a K-value of 60 and contained less than 1 part by weight of residual vinyl chloride monomer per 1 million parts by weight of polymer (ie. <1 ppm).

The special features compared with the general process described above are indicated below for the Comparison Tests A to H and for Examples 1 to 5, as well as the conversions determined, the residual quantities of vinyl chloride monomer in the polyvinyl chloride produced and the color rating determined on the polymer.

Comparison Test A

The process was carried out as described above, without adding anything further to the polymerization mixture. When the polymerization was terminated, the conversion of 77% by weight, relative to the monomer employed for the polymerization, was achieved. The polyvinyl chloride produced had a content of residual vinyl chloride monomer of 0.7 ppm (=0.00007% by weight). Color rating 7 (strong red-brown discoloration) was determined on the polymer.

Comparison Test B

The process was carried out as described above. During the second (main) polymerization stage, 532 g (=0.1% by weight, relative to the monomer employed for the polymerization) of di-n-octyltin bis-(ethylhexyl thioglycolate) having a small content of mono-n-octyltin tris-(ethylhexyl thioglycolate) (designated tin stabilizer I in the following text) was added to the polymerization mixture after reaching a conversion of 50%, corresponding to a polymerization time of about 3 hours. A conversion of 65% was reached after about 5 hours. The polymer produced contained 0.8 ppm (=0.00008% by weight) of residual vinyl chloride monomer and resulted in color rating 6 (orange-brown discoloration).

Comparison Test C

The process was carried out as described initially and polymerization was carried out without adding further substances. When the polymerization had been terminated and the bulk of the unreacted monomer had been removed by evacuating the autoclave to 5 kPa, 532 g (=0.1% by weight, relative to the monomer employed for the polymerization) of tin stabilizer I were added, and the steam treatment described earlier in the text was then carried out for 100 minutes. The polymerization was terminated after reaching a conversion of 85%. The polymer produced had a residual content of vinyl chloride monomer of 0.9 ppm (=0.00009% by weight) and led to color rating 7 (strong red-brown discoloration).

Comparison Test D

The process was carried out as described initially, but 532 g (=0.1% by weight, relative to the total monomer employed for the polymerization) of tin stabilizer I were added to the polymerization mixture at the start of the main polymerization. The main polymerization was terminated after about 5 hours. A conversion of 46% had been achieved up to that point. After further treatment of the polymer produced, as described above, a product was obtained which had a content of residual vinyl chloride monomer of 0.8 ppm and led to color rating 5 (brown-yellow discoloration).

Comparison Test E

The process was carried out as described initially, but 532 g (=0.1% by weight, relative to the total monomer employed for the polymerization) of tin stabilizer I were added to the polymerization mixture as early as the start of the preliminary polymerization. A conversion of 55% was achieved at the end of the whole polymerization. The product, which was subjected to after-treatment as described earlier in the text, had a residual vinyl chloride monomer content of 0.7 ppm and led to color rating 8 (strong violet-brown discoloration).

Comparison Test F

The process was carried out as described initially, but 220 g of azobisisobutyronitrile and 532 g (=0.1% by weight, relative to the total monomer employed in the polymerization) of tin stabilizer I were added to the second autoclave, of capacity 1 m$^3$, instead of the peroxide mixture described above. A conversion of 66% was reached at the end of the polymerization, while at the end of the after-treatment described above, a polyvinyl chloride was obtained which contained 0.9 ppm of residual vinyl chloride monomer and led to color rating 7 (strong red-brown discoloration).

Comparison Test G

The process was carried out as described initially, but 1,600 g (=0.3% by weight, relative to the monomer employed for the whole polymerization) of di-n-butyl-tin maleate were added to the reaction mixture after a conversion of 68% had been reached in the main polymerization. When the polymerization had been terminated, a conversion of 79% was reached. At the end of the after-treatment, as described above, a polyvinyl chloride was obtained which contained 0.9 ppm of residual vinyl chloride monomer and led to color rating 6 (orange-brown discoloration).

Comparison Test H

The process was carried out as described initially, but a mixture of 2,130 g (=0.4% by weight, relative to the total monomer employed) of calcium stearate and 530 g (=0.1% by weight, relative to the total monomer employed) of zinc stearate were added to the polymerization mixture before the start of the main polymerization. When the polymerization had been terminated, a conversion of 81% was obtained. At the end of the after-treatment, a polyvinyl chloride was obtained which had a content of residual vinyl chloride monomer of 0.9 ppm and which led to a color rating of 7 (strong red-brown discoloration).

EXAMPLE 1

The process was carried out as described initially. When a conversion of 65% had been reached in the main polymerization, 532 g (=0.1% by weight, relative to the total monomer employed in the polymerization) of tin stabilizer I were added to the polymerization mixture and polymerization was continued for a further 0.5 hour. A conversion of 77% was reached at the end of the polymerization. The after-treatment was carried out as described earlier in the text. This gave a polyvinyl chloride which had a residual content of vinyl chloride monomer of 0.8 ppm (=0.00008% by weight) and led to a color rating of 1 (the same as the standard).

EXAMPLE 2

The process was carried out as described in Example 1, but an equal quantity of 1,4-butanediol β-aminocrotonate was employed instead of tin stabilizer I. 72% conversion was obtained when the polymerization had been terminated; at the end of the after-treatment, the resulting polyvinyl chloride had a content of residual vinyl chloride monomer of 0.5 ppm and led to a color rating of 1 (the same as the standard).

EXAMPLE 3

The process was carried out as described initially, but the main polymerization was carried out for 6 hours. When a conversion of 80% had been reached, 532 g (=0.1% by weight, relative to the total monomer employed for the polymerization) of tin stabilizer I were added and polymerization was continued for a further 30 minutes. A conversion of 86% was reached at the end of the polymerization. After-treatment was then carried out, as described earlier in the text. This resulted in a polyvinyl chloride which contained 0.6 ppm of unreacted vinyl chloride monomer and led to a color rating of 1 (the same as the standard).

EXAMPLE 4

The process was carried out as described initially. When a conversion of 70% had been reached in the main polymerization, 5,300 g (=1% by weight, relative to the total monomer employed in the polymerization) of tin stabilizer I were added to the polymerization batch and polymerization was continued for a further 40 minutes. A conversion of 78% was reached at the end of the polymerization. After-treatment was then carried out, as described earlier in the text. The polyvinyl chloride thus obtained contained 0.8 ppm of residual unreacted vinyl chloride monomer and led to a color rating of 1 (the same as the standard).

EXAMPLE 5

The process was carried out as described initially. When a conversion of 75% had been reached in the main polymerization, 265 g (=0.05% by weight, relative to the total monomer employed in the polymerization) of tin stabilizer I were added to the polymerization mixture and polymerization was continued for a further 25 minutes. A conversion of 81% was reached at the end of the polymerization and after-treatment was then carried out, as described earlier in the text. This gave a polyvinyl chloride which contained 0.9 ppm of residual unreacted vinyl chloride monomer and led to a color rating of 2 (yellowish discoloration).

It was possible to employ the vinyl chloride polymers of K-value 60 produced in accordance with Examples 1 to 5, like customary vinyl chloride mass polymers of the same K value, without disadvantages, for example for thermoplastic processing in extruders or calenders.

We claim:

1. In a process for the mass polymerization of vinyl chloride at 30 to 80% C under pressure and with agitation of the polymerization mixture, in the presence of at least one peroxide polymerization catalyst which decomposes to form free radicals and of at least one heat stabilizer for polyvinyl chloride, and also in the presence of up to 30% by weight, relative to the final polymerization mixture, of monomers which are copolymerizable with vinyl chloride and also in the presence of polymerization auxiliary substances but in absence of major amounts of water in two stages, the transition from the first to the second polymerization stage taking place when 6 to 20% by weight of the monomer(s) employed in the first stage have been converted into polymer, and the polymerization in the second stage being completed when 65 to 90% by weight of the total monomer(s) employed have been converted into polymer, the unreacted monomer(s) then being removed from the polymer formed down to residual contents of less than 0.001% by weight, relative to the polymer, the improvement which comprises adding without any lubricants, pigments and polymeric polymer modifiers to the polymerization mixture, in the second polymerization stage when 60 to 85% by weight of the total monomer(s) employed have been converted into polymer, but when, after the completion of the polymerization, no monomer has yet been removed from the polymerization mixture, 0.01 to 3% by weight, relative to total monomers employed, of at least one heat stabilizer selected from the group consisting of aminocrotonic acid ester and monoalkyltin (IV) or dialkyltin-(IV) compound in which the residual valencies of the tin are attached to organic radicals via sulfur atoms.

2. The process as claimed in claim 1, wherein 0.05 to 1% by weight, relative to the monomers originally employed, of at least one of the heat stabilizers for polyvinyl chloride is added to the polymerization mixture.

3. The process as claimed in either of claims 1 or 2, wherein the addition of the heat stabilizer(s) for polyvinyl chloride is effected in the second stage of the polymerization, when 70 to 80% by weight of the total monomer(s) employed have been converted into polymers, and, after the addition, polymerization is continued for a further 10 to 45 minutes.

4. The process as claimed in any of claim 1 or 2, wherein the heat stabilizer employed is at least one di-n-octyltin-IV bis-(alkyl thioglycolate) in which each of the ester alkyl groups contains 8 to 16 C atoms.

5. The process as claimed in any of claim 1 or 2, wherein the heat stabilizer employed is at least one β-aminocrotonic acid ester containing, as the alcoholic component, an aliphatic dialcohol in which the carbon chain can be interrupted by a thioether bridge and contains 4 to 6 C atoms.

* * * * *